United States Patent Office 3,429,918
Patented Feb. 25, 1969

3,429,918
N,N′-ALKYLENEBIS[2-NITRO-(LOWER-ALKANAMIDES)]
Philip M. Carabateas, Schodack, N.Y., assignor to Sterling Drug Inc., New York, N.Y., a corporation of Delaware
No Drawing. Filed Dec. 2, 1966, Ser. No. 598,630
U.S. Cl. 260—561                 8 Claims
Int. Cl. C07c *103/44;* A61k *27/00*

ABSTRACT OF THE DISCLOSURE

N,N′-alkylenebis[2-nitro(lower-alkanamides)], having anthelmintic and hormonal activities, are prepared by reacting an alkylenediamine with two molar equivalents of a lower-alkyl 2-nitro(lower-alkanoate) or 2-nitro(lower-alkanoyl) halide.

---

This invention relates to compositions of matter known in the art of chemistry as bis(acyl)alkylenediamines and to a process for preparing such compositions.

The invention sought to be patented, in its composition aspect, resides in the class of compounds which I designate N,N′-alkylenebis[2-nitro(lower-alkanamides)] or, alternatively, as N,N′-bis[2-nitro(lower-alkanoyl)]alkylenediamines. Accordingly, I depict these compounds as having a molecular configuration in which 2-nitro-lower-alkanoyl) is attached to each nitrogen atom of alkylenediamines where alkylene has from two to ten carbon atoms and has its two connecting linkages on different carbon atoms.

The invention sought to be patented, in its process aspect, is described as residing in the process of reacting an alkylenediamines with two molar equivalents of a lower-alkyl 2-nitro(lower-alkanoate) or 2-nitro(lower-alkanoyl) halide to prepare said N,N′-alkylenebis[2-nitro (lower-alkanamides)].

The tangible embodiments of the composition aspect of the invention possess the inherent general physical properties of being colorless or white solids, substantially insoluble in water and of varying solubility in organic solvents. Examination of the compounds of the invention reveals, upon infrared spectrographic analysis, data confirming the molecular structures assinged to the compounds. These data, taken together with the nature of the starting materials, modes of synthesis and results of elementary analysis, positively confirm the structures of the compositions sought to be patented.

The tangible embodiments of the composition aspect of the invention possess the inherent applied use characteristics of exerting an anthelmintic effect in animal organisms, as determined by standard chemotherapeutic evaluation procedures in mice; and, of exerting hormonal effects, as evidenced by endocrinological evaluation according to standard procedures.

Without limiting the generality of the foregoing, illustrative and preferred embodiments of my N,N′-alkylenebis[2-nitro(lower-alkanamides)] are those of formula I

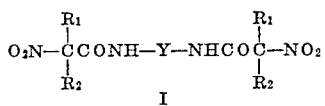

I where $R_1$ and $R_2$ are each hydrogen or alkyl and Y is alkylene.

Preferably $R_1$ and $R_2$ together have no more than four carbon atoms.

The term "alkylene," as used throughout this specification, e.g., as represented by Y in Formula I, means alkylene radicals having from two to ten carbon atoms inclusive and having its two connecting linkages on different carbon atoms, among which are, for purposes of illustration but without limiting the generality of the foregoing, —$CH_2CH_2$—,

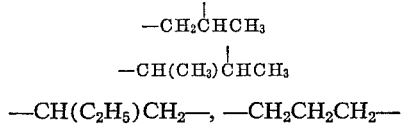

—$CH(C_2H_5)CH_2$—, —$CH_2CH_2CH_2$—

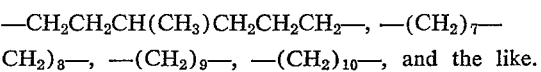

—$CH_2CH_2CH(CH_3)CH_2CH_2CH_2$—, —$(CH_2)_7$—

—$(CH_2)_8$—, —$(CH_2)_9$—, —$(CH_2)_{10}$—, and the like.

The term "2-nitro(lower-alkanoyl)," as used throughout this specification, means alkanoyl radicals having nitro attached to the 2-position, i.e., the position alpha or adjacent to the carbonyl function, and having from two to six carbon atoms which can be arranged as straight or branched chains, among which are, for purposes of illustration but without limiting the foregoing, 2-nitroethanoyl (nitroacetyl), 2-nitro-n-propanoyl (α-nitropropinonyl), 2-nitro-n-butanoyl (α-nitrobutyryl), 2-methyl-2-nitropropanoyl (α-nitroisobutyryl), 2-ethyl-2-nitrobutanoyl (α-ethyl-α-nitrobutyryl), 2-nitropentanoyl (α-nitrovaleryl), 2-methyl-2-nitrobutanoyl (α-methyl-α-nitrobutyryl), 3-methyl-2-nitrobutanoyl (α-nitroisovaleryl) and 2-nitrohexanoyl (α-nitrocaproyl). Correspondingly, as used throughout this specification, the terms "2-nitro(lower-alkanamide)" and "2-nitro(lower-alkanoate)" each contain said "2-nitro(lower-alkanoyl)" radical.

The term "lower-alkyl," as used throughout this specification, e.g., used in the name of one of the starting materials of said process, means alkyl radicals having from one to six carbon atoms, illustrated by methyl, ethyl, isopropyl, n-propyl, n-butyl, 2-butyl, isobutyl, n-amyl, n-hexyl, and the like.

The manner and process of making and using the invention will now be generally described so as to enable a person skilled in the art of chemistry to make and use the same, as follows:

The intermediate alkylenediamines and lower-alkyl 2-nitro(lower-alkanoates) used in my process are generally known compounds which are either commercially available or readily prepared by generally known procedures. For example, the lower-alkyl 2-nitro(lower-alkanoates) are conveniently prepared by reacting a lower-alkyl 2-bromo(lower-alkanoate) with sodium nitrite using dimethylformamide as the reaction medium.

My N,N′-alkylenebis[2-nitro(lower-alkanamides)] are prepared preferably by reacting an alkylenediamine with a lower-alkyl 2-nitro(lower-alkanoate). The reaction is carried out preferably by heating the alkylenediamine with the lower-alkyl 2-nitro(lower-alkanoate) in the absence of a solvent. While the reaction was found to take place by heating the reactants from about one to several hours at about 100° to 125° C., other temperatures in the range of about 50° to 150° C. can be used. Alternatively, the reaction can be carried out using a suitable solvent inert under the reaction conditions, e.g., ethanol, isopropyl alcohol, benzene, toluene, tetrahydrofuran, dioxane, and the like. The relative quantities of reactants used can vary depending upon the presence or absence of one or two available hydrogen atoms at the position alpha to the carbonyl function of the intermediate lower-alkyl 2-nitro(lower-alkanoates). Since said intermediate esters bearing one or two available alpha-hydrogen atoms results in the formation of an N,N′-alkylenebis[2-nitro (lower-alkanamide)] which forms a salt with the starting alkylenediamine involving the acidic alpha-hydrogen atoms of the final product and the two nitrogen atoms of the alkylenediamine, I found it convenient to use one mole of alkylenediamine per mole of ester. Half of the alkylenediamine thus enters into the reaction with the ester to form the N,N'-alkylenebis[2-nitro(lower-alkanamide)] final product and the other half forms a salt with the final product. The salt is conveniently converted to the desired final product by treating it with a strong inorganic acid or an organic sulfonic acid, e.g., hydrochloric acid, hydrobromic acid, methanesulfonic acid, para-toluenesulfonic acid, or the like, preferably hydrochloric acid in ethanol as illustrated hereinbelow. When the starting lower - alkyl 2 - nitro(lower - alkanoate) has no available α-hydrogen atoms, e.g., the compounds of Formula I above where $R_1$ and $R_2$ are each methyl or ethyl, I found it convenient to run the reaction using at least two molar equivalents of lower-alkyl 2-nitro(lower-alkanoate) per mole of alkylenediamine.

Alternatively, my N,N' - alkylenebis[2 - nitro(loweralkanamides)] are prepared by reacting an alkylenediamine with a 2-nitro(lower-alkanoyl) halide, preferably chloride. The reaction is run preferably at about room temperature using two molar equivalents of halide to diamine and in the presence of a suitable acid-acceptor, e.g., triethylamine, to take up the hydrogen halide formed by the reaction.

The best mode contemplated by the inventor of carrying out his invention will now be set forth, as follows:

A mixture of 11.2 g. of ethyl nitroacetate and 9.94 g. of hexamethylenediamine was heated with stirring for three hours on a steam bath. The reaction mixture was allowed to cool, was acidified with ethanolic hydrogen chloride, and the acidic soltuion poured into water. The white solid was collected, recrystallized from acetonitrile and dried in vacuo to yield 4.2 g. of N,N'-hexamethylenebis(nitroacetamide), M.P. 147.0–148.0° C. (corr.) with decomposition.

Following the above-described procedure but using corresponding molar equivalent quantities of the appropriate ethyl 2-nitro(lower-alkanoate) and alkylenediamine the following compounds were obtained: N,N'-hexamethylenebis(2-methyl - 2 - nitropropanamide), M.P. 168.0–170.0° C. (corr.), by heating a mixture of 16.1 g. of ethyl 2-methyl-2-nitropropanoate and 5.8 g. of hexamethylenediamine for five hours at 125° C. and recrystallizing from acetonitrile; N,N'-1,2-ethylenebis(2-methyl-2-nitropropanamide), M.P. 182.8–185.0° C. (corr.), by heating a mixture of 32.2 g. of ethyl 2-methyl-2-nitropropanoate and 6.0 g. of ethylenediamine for five hours at 100° C. and recrystallizing from acetonitrile; N,N'-tetramethylenebis(2-methyl - 2 - nitropropanamide), M.P. 207.5–208.5° C. (corr.), by heating a mixture of 32.2 g. of ethyl 2-methyl-2-nitropropanoate and 8.8 g. of tetramethylenediamine for five hours at 110° C. and recrystallizing twice from acetonitrile; N,N' - octamethylenebis (nitroacetamide), M.P. 143.0–144.0° C. (corr.) with decomposition, by heating a mixture of 26.6 g. of ethyl nitroacetate and 28.8 g. of octamethylenediamine on a steam bath for ninety minutes and recrystallizing from 95% ethanol; N,N'-trimethylenebis(2-methyl-2-nitropropanamide), M.P. 105.0–108.6° C. (corr.), by heating a mixture of 32.2 g. of ethyl 2-methyl-2-nitropropanoate and 7.4 g. of trimethylenediamine for seven hours at 100° C. and recrystallizing twice from benzene-n-hexane using decolorizing charcoal; N,N'-octamethylenebis(2-methyl-2-nitropropanamide), M.P. 138.0–141.0° C. (corr.), by heating a mixture of 32.2 g. of ethyl 2-methyl-2-nitropropanoate and 14.4 g. of octamethylenediamine for five hours at 120° C. and recrystallizing once from acetonitrile and twice from ethanol.

N,N' - hexamethylenebis(nitroacetamide) is also prepared by reacting hexamethylenediamine at about room temperature, i.e., about 25° C., with two molar equivalents of nitroacetyl chloride in the presence of triethylamine to take up the hydrogen chloride formed by the reaction.

The foregoing description of the invention is for purpose of illustration and does not limit the generality of the applicability of the inventive concept as herein set forth. Other N,N'-alkylenebis[2-nitro-(lower alkanamides)] can be prepared in the manner above described by using the appropriate lower-alkyl 2 - nitro - (lower-alkanoate) and alkylenediamine. Further illustrative compounds thus prepared are: N,N'-3-methyl-1,6-hexanebis(nitroacetamide) by reacting 3-methyl-1,6-hexanediamine with ethyl nitroacetate; N,N'-heptamethylenebis(nitroacetamide) by reacting heptamethylenediamine with ethyl nitroacetate; N,N'-octamethylenebis(2-nitropropanamide) by reacting octamethylenediamine with ethyl 2-nitropropanoate; N,N'-hexamethylenebis(2-nitrobutanamide) by reacting hexamethylenediamine with ethyl 2-nitrobutanoate; N,N'-hexamethylenebis(2-ethyl-2-nitrobutanamide) by reacting hexamethylenediamine with ethyl 2-ethyl-2-nitrobutanoate; N,N'-1,2-propylenebis(2-nitroacetamide) by reacting 1,2-propylenediamine with methyl nitroacetate; N,N'-1,3-propylenebis(nitroacetamide) by reacting 1,3-propylenediamine with n-propyl nitroacetate; N,N'-1,2-ethylenebis (2-nitroacetamide) by reacting ethylenediamine with n-hexyl nitroacetate; N,N' - nonamethylenebis(nitroacetamide) by reacting nonamethylenediamine with ethyl nitroacetate; N,N'-decamethylenebis(nitroacetamide) by reacting decamethylenediamine with ethyl nitroacetate; N,N'-hexamethylenebis(2-nitropentanamide) by reacting hexamethylenediamine with ethyl 2-nitropentanoate; N,N'-hexamethylenebis(2-nitrohexanamide) by reacting hexamethylenediamine with ethyl 2-nitrohexanoate; N,N'-hexamethylenebis(3 - methyl - 2-nitrobutanamide) by reacting hexamethylenediamine with ethyl 3-methyl-2-nitrobutanoate; N,N' - octamethylenebis(2 - methyl-2-nitrobutanamide) by reacting octamethylenediamine with ethyl 2-methyl - 2 - nitrobutanoate; N,N' - hexamethylenebis(2-methyl-2-nitropentanamide) by reacting hexamethylenediamine with ethyl 2-methyl-2-nitropentanamide; and, N,N'-hexamethylenebis(2-nitropropanamide) by reacting hexamethylenediamine with ethyl 2-nitropropanoate. The intermediate lower-alkyl 2-nitro(lower-alkanoates) are prepared by reacting the corresponding lower-alkyl 2-bromo(lower-alkanoate) with sodium nitrite in dimethylformamide.

Standard chemotherapeutic and endocrinological evaluation procedures were carried out in mice and rats to demonstrate the anthelmintic and horomonal effects of the N,N' - alkylenebis[2 - nitro(lower-alkanamides)]. For example, when administered orally to Swiss mice naturally infected with *Aspicularis tetraptera* (i.e., pinworm), N,N'-hexamethylenebis(nitroacetamide) was found to clear 100% of the mice (5 out of 5 mice per dose level) at 100 and 200 mg. per kg. per day for four days; and N,N'-octamethylenebis(acetamide) was found to clear 60% (3/5), 100% (5/5) and 100% (5/5) of the animals at respective doses of 100, 200 and 400 mg. per kg. per day for four days. In another chemotherapeutic test, when administered orally to Swiss mice infected with the tapeworm *Hymenolepis nana*, N,N' - octamethylenebis(2-methyl-2-nitropropanamide) was found to clear 80% (4/5) of the mice at 400 mg. per kg. per day for four days. In a standard test to determine modification of estrogen-induced endocrinopathies, the N,N'-alkylenebis-[2-nitro(lower-alkanamides)] were found to show varying endocrinological effects. For example, when administered subcutaneously in a vehicle of cottonseed oil containing 10% ethanol to sexually mature male rats which received concurrently a standard dose (0.10 mg./kg./day for 12 days) of the estrogen, diethylstilbestrol dipalmitate, N,N'-trimethylenebis(2-methyl-2-nitropropanamide) (100 mg./kg./day for 12 days) was found to potentiate the estrogen-induced enlargement of the adrenals. Injections were given once daily, six days a week for two weeks. At autopsy the average weights of the testes and sex accessory organs, i.e., ventral prostrate, seminal vesicles, thymus, adrenals and pituitary, of the rats which received both said compound and estrogen were compared with those of the group of six rats which were given only the estrogen. When tested in the same manner, N,N'-octamethylenebis(acetamide) (50 mg./kg./day for 12 days) was found to prevent estrogen-induced enlargement of the adrenals.

The subject matter which the applicant regards as his invention is particularly pointed out and distinctly claimed as follows:

1. N,N'-alkylenebis[2-nitro(lower-alkanamide)] where alkylene has from two to ten carbon atoms and has its two connecting linkages on different carbon atoms.

2. N,N'-hexamethylenebis(nitroacetamide), according to claim 1 where alkylene is hexamethylene and 2-nitro(lower-alkanamide) is nitroacetamide.

3. N,N'-hexamethylenebis(2-methyl-2-nitro-propanamide), according to claim 1 where alkylene is hexamethylene and 2-nitro(lower-alkanamide) is 2-methyl-2-nitropropanamide.

4. N,N'-1,2-ethylenebis(2-methyl-2-nitropropanamide) according to claim 1 where alkylene is 1,2-ethylene and 2-nitro(lower-alkanamide) is 2-methyl-2-nitropropanamide.

5. N,N'-tetramethylenebis(2-methyl-2-nitropropanamide), according to claim 1 where alkylene is tetramethylene and 2-nitro(lower-alkanamide) is 2-methyl-2-nitropropanamide.

6. N,N'-octamethylenebis(nitroacetamide), according to claim 1 where alkylene is octamethylene and 2-nitro(lower-alkanamide) is nitroacetamide.

7. N,N'-trimethylenebis(2-methyl-2-nitropropanamide), according to claim 1 where alkylene is trimethylene and 2-nitro(lower-alkanamide) is 2-methyl-2-nitropropanamide.

8. N,N'-octamethylenebis(2-methyl-2-nitropropanamide), according to claim 1 where alkylene is octamethylene and 2-nitro(lower-alkanamide) is 2-methyl-2-nitropropanamide.

References Cited

Sidgwick, Organic Chemistry of Nitrogen, p. 138, (1937).

NICHOLAS S. RIZZO, *Primary Examiner.*

J. A. NARCAVAGE, *Assistant Examiner.*

U.S. Cl. X.R.

424—320